United States Patent [19]
Sweeney et al.

[11] Patent Number: 5,842,677
[45] Date of Patent: Dec. 1, 1998

[54] SAFETIED SANDWICH MOUNT ASSEMBLY WITH INTEGRAL HOLDING AND CENTERING FEATURE

[75] Inventors: Shannon K. Sweeney, Erie, Pa.; Roger D. Krause, McHenry, Ill.; Gary A. Gukeisen, Dubuque, Iowa

[73] Assignee: Lord Corporation, Cary, N.C.

[21] Appl. No.: 721,157

[22] Filed: Sep. 26, 1996

[51] Int. Cl.⁶ .................................................. F16M 13/00
[52] U.S. Cl. ........................... 248/635; 248/634; 248/56; 267/293
[58] Field of Search .................................... 248/635, 634, 248/27.1, 659, 576, 56; 267/293, 294, 141.1

[56] References Cited

U.S. PATENT DOCUMENTS

| | | | |
|---|---|---|---|
| 2,361,184 | 10/1944 | Ellis et al. | 248/358 |
| 2,819,105 | 1/1958 | Behnke | 528/874 |
| 3,687,404 | 8/1972 | Werner | 248/7 |
| 4,213,718 | 7/1980 | Lumby | 403/197 |
| 4,306,708 | 12/1981 | Gassaway | 267/141.3 |
| 4,579,184 | 4/1986 | Hiramoto | 180/68.4 |
| 4,783,039 | 11/1988 | Peterson et al. | 248/635 |
| 5,056,763 | 10/1991 | Hamada et al. | 267/141 |
| 5,110,081 | 5/1992 | Lang, Jr. | 248/635 |
| 5,145,330 | 9/1992 | Uchiyama | 417/363 |
| 5,154,403 | 10/1992 | Sato | 248/635 |
| 5,248,134 | 9/1993 | Ferguson et al. | 267/220 |
| 5,295,652 | 3/1994 | Byrne | 248/635 |
| 5,303,896 | 4/1994 | Sterka | 248/557 |
| 5,335,893 | 8/1994 | Opp | 248/635 |
| 5,390,758 | 2/1995 | Hunter et al. | 248/635 |
| 5,405,118 | 4/1995 | Dietz et al. | 248/632 |
| 5,472,226 | 12/1995 | Bunker | 280/681 |
| 5,511,997 | 4/1996 | Yoshida | 440/52 |
| 5,516,176 | 5/1996 | Kimoto et al. | 216/35.1 |
| 5,551,675 | 9/1996 | Simuttis et al. | 267/293 |
| 5,601,304 | 2/1997 | Tilly et al. | 280/673 |
| 5,641,153 | 6/1997 | Gwinn | 267/141.1 |

FOREIGN PATENT DOCUMENTS

| | | |
|---|---|---|
| 0 754 877 A1 | 7/1997 | European Pat. Off. . |
| 196 28 651 A1 | 1/1997 | Germany . |
| 296 17 816 U | 1/1997 | Germany . |

*Primary Examiner*—Ramon O. Ramirez
*Assistant Examiner*—Kimberly Wood
*Attorney, Agent, or Firm*—Randall S. Wayland

[57] ABSTRACT

The inner periphery of the elastomer portion of a safetied elastomeric sandwich mount assembly is provided with a protrusion that engages the outer periphery of the rigid spacer to hold the three elements of the mount assembly together on either side of the support until the supported member such as an engine or cab of an off-highway vehicle, for example, can be bolted thereto. The protrusion also provides a centering feature that facilitates insertion of the retaining bolt.

10 Claims, 2 Drawing Sheets

SAFETIED SANDWICH MOUNT ASSEMBLY WITH INTEGRAL HOLDING AND CENTERING FEATURE

BACKGROUND AND SUMMARY OF THE INVENTION

The present invention is directed to a safetied sandwich mount assembly having three pieces that can be preassembled on the support structure without the use of a retaining bolt.

Sandwich mount assemblies have been previously used in off-highway vehicles to attach a supported member such as a vehicle engine, cab, or the like to a support such as a frame. One such assembly includes a pair of elastomeric sandwich members and a rigid axial spacer that extends through the support and maintains a prescribed distance between the plates that are bonded to the outwardly positioned faces of the elastomeric layers.

In the assembly line for the off-highway vehicle, the mounts are installed at one station, the engine or cab at another station and, sometimes the retaining bolt is not secured until yet a third station. Since these conventional sandwich mounts have no means of remaining together, the line workers must jury-rig something. Some use masking tape to hold the three parts in approximate alignment; others will pre-bolt the mount on the vehicle with the retaining bolt necessitating removal when the vehicle arrives at the cab or engine installation station. Still others will merely try to attach the mount assembly components to the frame by some means with parts occasionally being lost as the line moves the vehicle from station to station.

Yet another problem with the mount assembly of this type relates to alignment of the three components. The installation of the retaining bolt, whether done as a preassembly operation or when bolting the engine or cab in place, naturally requires the throughbores of the three components to be in alignment to receive the shank of the bolt. It is generally necessary to insert a screwdriver or other such tool thorough the three components and rattle it around to produce the desired alignment. This requires added assembly time and produces additional aggravation for the line workers.

The present invention overcomes these difficulties by providing the internal periphery of each elastomeric layer of each sandwich mount with at least one protrusion means that grips the rigid spacer. This, not only enables the assembly to be pre-assembled on the vehicle without the use of a retainer bolt, it also provides alignment of the throughbores so that the retainer bolt can be installed at the proper time.

Various other features, advantages, and characteristics of the present invention will become apparent after a reading of the following detailed specification.

BRIEF DESCRIPTION OF THE DRAWINGS

These Figures describe the preferred embodiments of the present invention, like parts bearing like reference numerals, and in which.

DETAILED DESCRIPTION OF THE PREFERRED EMBODIMENTS

Figure 1:
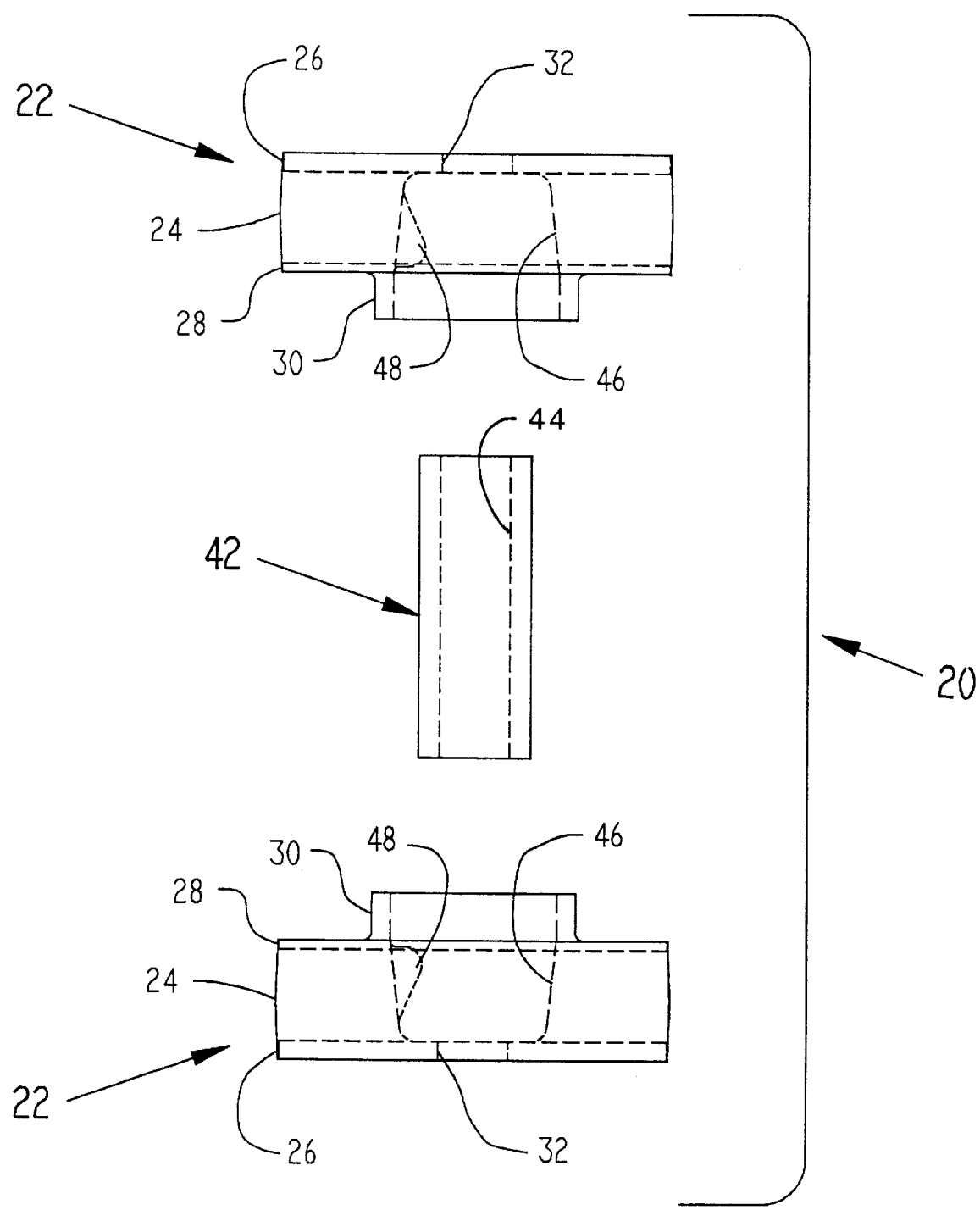
FIG. 1 is an exploded side view of the three elements of the sandwich mount assembly of a first embodiment of the present invention.

A first embodiment of the sandwich mount assembly of the present invention is depicted in FIG. 1 generally at 20. Assembly 20 has three basic components, first and second members comprised of identical elastomeric sandwich mounts 22 and a third member comprised of a rigid spacer member 42. Since first and second members 22 are identical, a description of one will suffice to describe both.

Each elastomeric sandwich mount 22 includes an elastomeric layer 24 having a first plate 26 bonded to one laterally extending face and a second plate 28 bonded to a second opposite laterally extending face. The elastomer can be selected as a function of the design parameters including hardness, isolation properties, high- and low-temperature performance, durability, etc., but will generally be selected from a group consisting of natural rubbers, synthetic rubbers and blends thereof.

Figure 2:
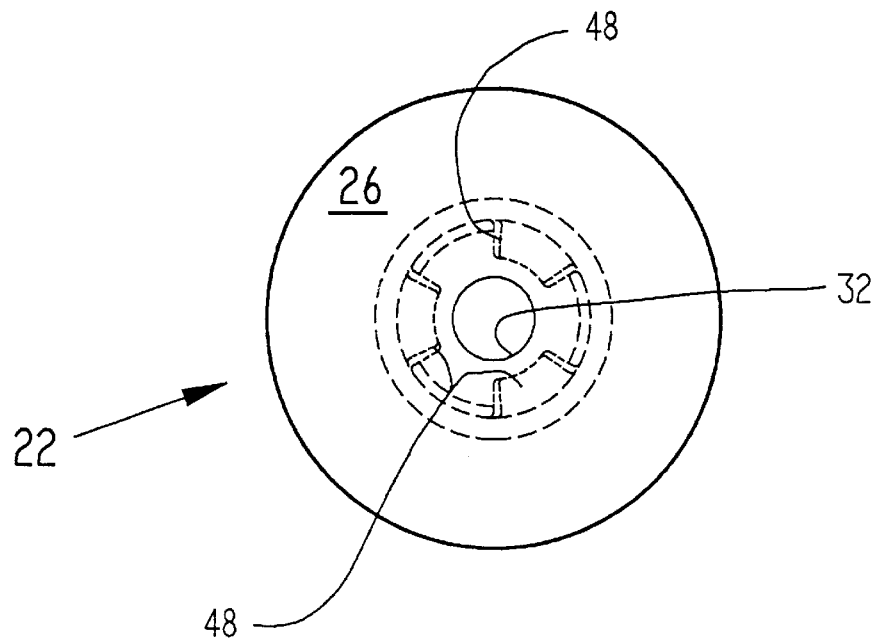
FIG. 2 is a top view of the elastomeric sandwich mount used in the FIG. 1 embodiment.
Figure 3:
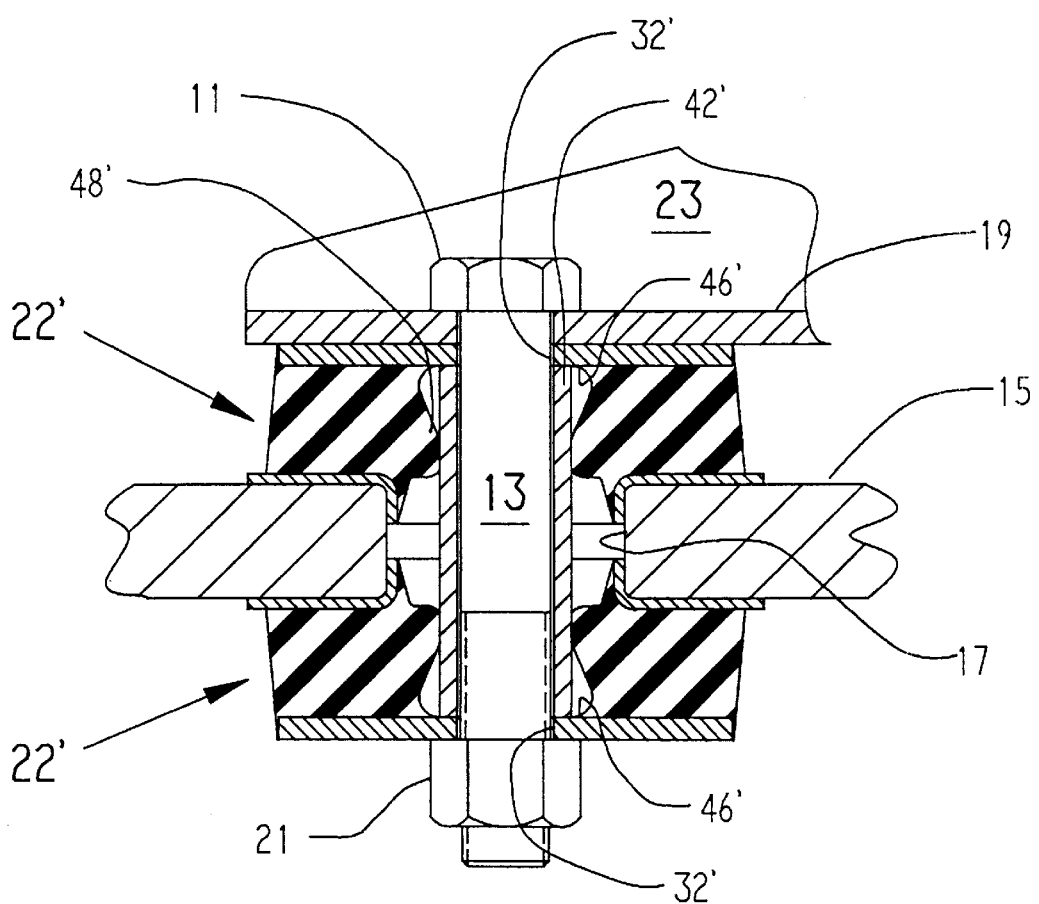
FIG. 3 is a cross-sectional side view of a second embodiment of the present invention shown assembled between a supported member and a support.

Second plate 28 has a outwardly projecting axial stem portion 30. First plate 26 has an axial throughbore 32 having a first diameter adequate to accommodate a shank 13 of retaining bolt 11 (FIG. 3). Rigid spacer 42 has an axial throughbore 44 which has a diameter that is substantially equal to that of throughbore 32. Elastomeric layer 24 has an internal surface 46 with a dimension which is generally large enough to accommodate the external dimension of spacer 42 in non-touching relationship. In addition, internal surface 46 has at least one protuberance 48 which extend inwardly to a dimension that is less than the outer dimension of the spacer 42. In the embodiment of FIGS. 1 and 2, the at least one protuberance 48 comprises three protrusions at a common axial location to define a diameter that will effectively grip spacer 42, but not with a pressure so great as to prevent the spacer 42 of mount assembly 20 to be inserted or removed manually. The mount 20 is regarded as being safetied since the diameter of rigid spacer 42 is greater than the diameter of throughbore 32 and the diameter of plates 26 are greater than the diameter of the opening 17 in support 15. Accordingly, the supported member 13 can not free itself from support 11, even should the elastomer integrity be compromised.

In the FIG. 3 second embodiment, all items are like those of the first embodiment, with the exception that the protuberance 48' comprises a single annular protrusion. The first embodiment is preferred since the sandwich mount 22 is more easily removed from the mold. As shown in FIG. 3, stem portions 30' extend toward one another into the opening 17 in support 15 and are juxtaposed in non-engaging relationship.

To install the safetied sandwich mount 20' of the present invention, spacer 42' can be inserted into either of the two sandwich mounts 22 with protuberance 48' frictionally gripping spacer 42' and preventing its unintended removal. Spacer 42' can then be extended through opening 17 in support 15 and its free end pushed into the elastomeric layer 24' of the other mount 22' such that protuberance 48' engages spacer 42' and retains the three principle components of mount assembly 20' together until flange 19 of supported member 23 can be positioned above throughbore 32' and bolt 11 secured with nut 21. Protuberance 48' further aligns (centers) spacer 42' with respect to the two throughbores 32' to enable bolt 11 to be easily inserted, it being appreciated that were protuberance 48' not present, the size of opening 46' would permit spacer 42 significant freedom to rattle around in the cavity formed by the two openings 46' and opening 17. Axial compressive loading of upper sandwich mount 22' will result in expansion of lower sandwich mount 22' by spacer 42' and visa versa.

Various changes, alternatives and modifications will become apparent to a person of ordinary skill in the art following a reading of the foregoing specification. It is intended that all such changes, alternatives and modifications as come within the scope of the appended claims be considered part of the present invention.

What is claimed is:

1. A safetied sandwich mount assembly for securing a supported member to a support, said sandwich mount assembly including a first member comprised of an elastomeric sandwich member adapted to be positioned between said supported member and said support to cushion compressive relative movement therebetween, a second member comprised of an elastomeric sandwich member adapted to be positioned beneath said support to cushion expanding movement of said supported member relative to said support, a third member comprised of a rigid spacer member extending between said first and second elastomeric sandwich members and adapted to extend through said support, each of said first, second and third members having an axial throughbore of substantially the same diameter, said sandwich mount assembly being characterized by each of said elastomeric sandwich members having at least one internal protuberance which extends inwardly to define a dimension less than an external dimension of said third member such that when said elastomeric sandwich members are assembled with said rigid spacer member such that said first elastomeric sandwich member overlies said support and said second elastomeric sandwich member, with said third member extending substantially vertically through said support, said internal protuberances exhibit a sufficient gripping force on said rigid spacer such that said second elastomeric sandwich member and said rigid spacer are suspended on said support against a gravitational pull of their own weights and said elastomeric sandwich members are retained on said rigid spacer member prior to insertion of a retaining bolt and said axial throughbores of said three members are pre-aligned to receive said retaining bolt.

2. The sandwich mount assembly of claim 1 further characterized by each said elastomeric sandwich member including an elastomeric layer, a rigid plate bonded to an outwardly facing surface of said elastomeric layer, said rigid plate having said axial throughbore which is substantially equal in diameter to the diameter of said throughbore of said third member.

3. The sandwich mount assembly of claim 2 further characterized by said elastomeric layer having an internal dimension generally large enough to receive said external dimension of said third member, said protuberance providing the only engagement with an external surface portion of said third member.

4. The sandwich mount assembly of claim 3 further characterized by said at least one protuberance comprising a continuous annular protrusion molded about a portion of said internal dimension of each elastomeric layer of said elastomeric sandwich members.

5. The sandwich mount assembly of claim 3 further characterized by said at least one protuberance comprising a series of individual, spaced apart protrusions molded about a portion of said internal dimension of each elastomeric layer of said elastomeric sandwich members.

6. The sandwich mount assembly of claim 2 further characterized by each elastomeric sandwich member including a second plate bonded to the interior surface, said second plate having a first face bonded to said elastomeric layer and an axial stem portion extending from a second opposed face of said second plate, said axial stem portions being juxtaposed in non-engaging position in said sandwich mount assembly.

7. The sandwich mount assembly of claim 6 further characterized by said second plate with its axial stem portion having an internal dimension large enough to receive said third member in non-touching relationship.

8. A safetied mount assembly, comprising:
   (a) first and second mounts each including a first plate having a axial throughbore, a second plate including a throughhole, and an elastomer layer bonded therebetween, said elastomer layer including an internal cavity having an internal dimension,
   (b) a rigid spacer having an external dimension extending between said first and second mounts, said external dimension being smaller than said internal dimension of said elastomer layer, and
   (c) at least one internal protuberance inwardly projecting from each elastomer layer to define a dimension less than said external dimension of said spacer whereby when said mounts are assembled with said spacer, said at least one internal protuberance on each said mount will exhibit a sufficient gripping force on said spacer to retain said assembly together prior to insertion of a retaining bolt.

9. A safetied mount assembly, comprising:
   (a) first and second mounts each including a first plate having an axial throughbore, a second plate including a throughhole and a projecting stem portion, and a substantially annular elastomer layer bonded therebetween, said elastomer layer including an internal cavity having an internal dimension,
   (b) a rigid spacer having an external cylindrical dimension and an axial throughbore for receiving a retaining bolt, said spacer extending through said throughholes and said cavities in said first and second mounts, said external cylindrical dimension being smaller than said internal dimension of said elastomer layer, and
   (c) a plurality of spaced apart internal elastomeric protuberances inwardly projecting from each said elastomer layer to define a dimension less than said external cylindrical dimension of said spacer whereby when said mounts are assembled with said spacer, said plurality of internal elastomeric protuberances on each said mount exhibit a sufficient gripping force on said spacer to retain said assembly together prior to insertion of said retaining bolt.

10. An assembly comprising a support and a safetied sandwich mount assembly for securing a supported member to said support, said sandwich mount assembly including a first member comprised of an elastomeric sandwich member positioned above said support, a second member comprised of an elastomeric sandwich member positioned beneath said support and beneath said first elastomeric sandwich member, a third member comprised of a rigid spacer member extending between said first and second elastomeric sandwich members and extending through said support, each of said first, second and third members having an axial throughbore of substantially the same diameter, said sandwich mount assembly being characterized by each of said elastomeric sandwich members having at least one internal protuberance which extends inwardly to define a dimension less than an external dimension of said third member such that when said elastomeric sandwich members are assembled with said rigid spacer member, said internal protuberances exhibit a sufficient gripping force on said rigid spacer such that said second elastomeric sandwich member and said rigid spacer are suspended on said support against a gravitational pull of their own weights and said elastomeric sandwich members are retained on said rigid spacer member prior to insertion of a retaining bolt and said axial throughbores of said three members are pre-aligned to receive said retaining bolt.

\* \* \* \* \*